Jan. 13, 1959
D. P. MARQUIS ET AL
2,868,263
WEDGE BIASED MEANS FOR MAKING A JOINT
SOCKET IN THE SIDE OF A TUBE
Filed Sept. 4, 1952
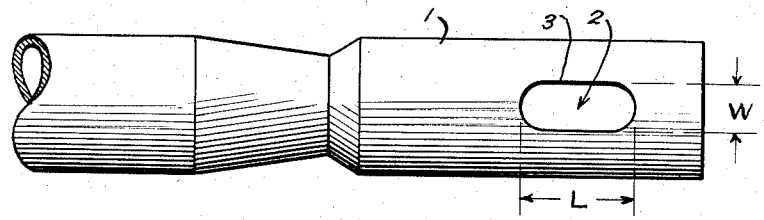
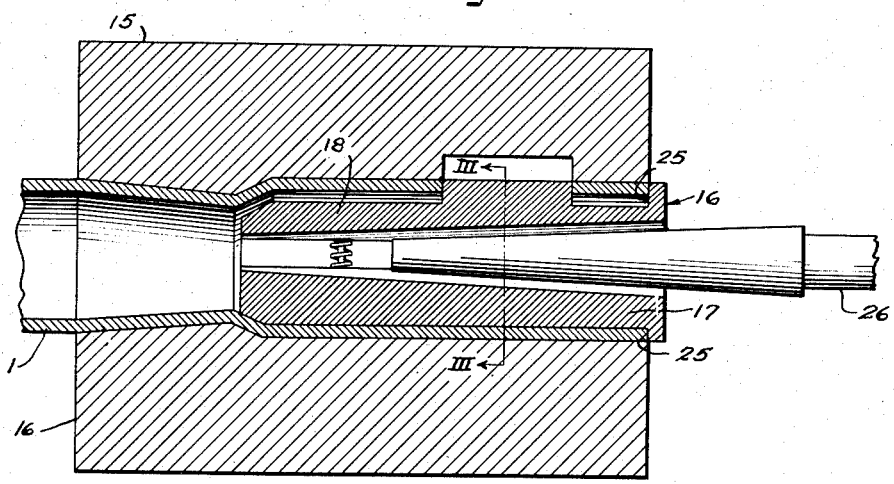
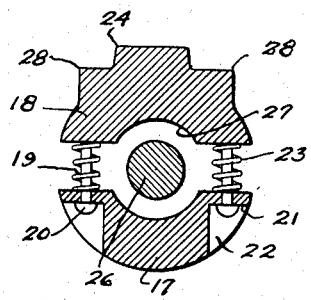
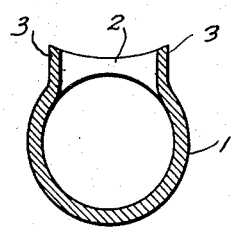
Inventors
Donald P. Marquis
Oliver S. French
by Hill, Sherman, Meroni, Gross & Simpson Attys.

United States Patent Office 2,868,263
Patented Jan. 13, 1959

2,868,263

WEDGE BIASED MEANS FOR MAKING A JOINT SOCKET IN THE SIDE OF A TUBE

Donald P. Marquis, Ferndale, and Oliver S. French, Detroit, Mich., assignors to Thompson Products, Inc., Cleveland, Ohio, a corporation of Ohio Application September 4, 1952, Serial No. 307,816

1 Claim. (Cl. 153—21)

The present invention relates to apparatus for the construction of sockets of the type used with ball studs in the formation of universally pivotal ball and socket joints.

More particularly, the invention relates to a novel apparatus used in the manufacture of a ball joint socket. The construction herein disclosed contemplates the provision of a ball socket in a sheet metal tubular member such as that now commonly used for drag links and tie rods in automotive vehicles.

In the past it has been found desirable to employ tubular bars for use as drag links. It has been found that as to the forces involved in such a bar, the tubular construction offers more than adequate strength and stiffness, and also provides the extremely desirable advantage of greatly reduced weight. One method of manufacturing sockets in the ends of these tubular drag links has been to cut an opening in the side of the tube equal to the diameter of the ball stud, then cut a slot along the length of the tube from the edge of the first opening, placing the ball stud in the first opening and then moving the stud laterally along the length of the tube with the shank projecting through the second opening or slot which is insufficient in size to pass the ball. A spring or other biasing means is then inserted in the end of the tube to bias the ball stud toward the end of the second opening in order to prevent the ball from realigning itself with the first opening and becoming disassembled from the drag link.

It has been found that this method of construction produces a structurally weakened section of the drag link at the point of the transverse diameter of the first opening. This is true since at that point the greatest amount of material has been removed from the cross-section of the drag link. The amount of metal remaining at that point is, in fact, barely more than half.

This sharp reduction in the amount of metal in the tubular drag link causes a great reduction in strength for two reasons. In the first place, the link is at best half as strong as at a portion where the tube is complete and, in the second place, in actual practice it has been found that the strength of the tube is less due to the stress concentrations formed at the reduced area.

It has been found that the first aperture produces a nick effect with the result that stresses become highly concentrated at that point and after heavy use, with resultant fatigue, the drag link has been found to fail at this point.

Since steering linkages are one of the most vital parts of the automotive running gear from the point of view of safety, and since failure of any of the parts of the steering linkage very generally causes serious injury and damage to the occupants of the vehicle, it is an object of the present invention to provide apparatus for producing a drag link construction in which the heretofore weakened area is eliminated.

Yet another object of the present invention is to provide a novel apparatus for the manufacture of ball joint sockets.

A further feature of the present invention is the provision of apparatus for producing a ball joint socket in which the material surrounding the aperture through which the ball is assembled is deformed rather than removed.

Still another feature of the present invention is the provision of apparatus for producing a tubular ball joint socket whose weakest point is determined by the diameter of the shank of the ball stud.

Another object of the present invention is the provision of apparatus for manufacturing sockets for ball joints which removes the minimum amount of material from the socket.

Still a further feature of the present invention is a novel apparatus for manufacturing a socket for ball studs, in which the aperture through which the ball element is assembled into the housing is constructed so as to be reinforced rather than weakened.

Still other and further objects will be apparent to those skilled in the art upon consideration of the following detailed description and drawings.

On the drawings:

Figure 1 is a plan view of the tubular housing for a ball socket, in which an initial slot has been cut;

Figure 2 is a cross-sectional view of an alternative tool which may be used in the manufacture of novel socket construction;

Figure 3 is a cross-sectional view of the expanding tool taken along the lines III—III of Figure 2 and showing the expanding tool in its non-compressed condition; and Figure 4 is a cross-sectional view of the tubing showing the opening formed therein after the working operation.

As shown on the drawings:

In constructing the ball joint socket of our invention, we utilize a length of tubing generally indicated at 1. This tubing may take the form shown in Figure 1 or it may be of plain configuration, the external design being a matter of choice.

As shown in Figure 1, this tubing 1 is pierced by means of a punch press or any other equivalent means such as drilling and milling, with a slot generally indicated at 2. The length L of the slot is approximately equal to the diameter of the ball element which is to be housed by the socket. The width W on the other hand, is much smaller than the diameter of the ball element and it is apparent that in the condition of the housing shown in Figure 1, the ball element could not be inserted therethrough. In order that the ball element may be passed through the slot 2 the sides 3 must be moved away from each other a distance equal to the diameter of the ball. In the prior art constructions this was done merely by removing metal from the sides 3 so that a circular aperture remained. As noted earlier, however, this resulted in a serious defect in the finished product since the cross-sectional area of the tube walls at the transverse diameter of that aperture was very small and tended to concentrate the stresses placed upon the system by vibration during use.

In Figure 2 there is shown apparatus for shaping the slot 2 to the desired form comprising a pair of die blocks 15 and 16 which are clamped about the tubular housing 1. An expandable drawing die generally indicated at 16 is inserted within the tubular housing 1 in a position shown in Figure 2. The drawing die 16 is made up of two halves 17 and 18 which are held together by pins 19 having heads 20 which cooperate with the bottoms 21 of recesses 22. Springs 23 bias the parts 17 and 18 apart. As may clearly be seen from Figure 3, a guide portion 24 is provided on the member 18 for alignment with the aperture 2 shown in the view of the housing in Figure 1.

When the die members 17 and 18 are inserted in the housing 1, they are positioned with respect to the aperture 2 by means of the guide surface 24 and the abutment surfaces 25. The wedge bar 26 is then inserted within the cavity 27 between the die members 17 and 18. Reciprocation of the rod 26 cams the member 18 upwardly causing the surfaces 28 of the member 18 to draw the sides 3 of the slot 2 upwardly and outwardly. The effect of this operation is to draw the sides 3 of the slot 2 upwardly and outwardly into a generally circular shape as shown in the cross-sectional view of tube 1 after the drawing operation in Figure 4. While it is not shown in the drawings it is contemplated that a conventional knock-out bar be supplied for moving the member 18 downwardly to remove it from the enlarged aperture 3 should it be found that such a supplemental mechanism is necessary.

It will be noted that the result of this operation is to leave an aperture 2 in the side of the housing 1 which is approximately circular and which has upstanding side walls. This aperture should be sufficiently large to allow insertion of the ball element into the housing 1. In order to prevent disassembly of the ball element from the housing, the aperture 2 after the drawing operation may be enlarged to a conventional keyhole form by drilling or milling a narrower continuation of aperture 2 axially of the housing 1. The continuation aperture should be of a diameter slightly larger than the diameter of the stud shank which connects the ball to the member by which it is to be actuated. After insertion of the ball into the aperture 2, it is then moved to the left of the aperture 2 into the continuation aperture and is maintained in that position by means of springs or other conventional means inserted in the open end of the housing 1 and which are not shown. From the above disclosure it will be apparent that we have provided a novel apparatus for constructing or forming a socket for use in ball joints utilizing a ball element having a connecting stud shank, and that this apparatus is well adapted to high speed mass production operations.

It will be understood that modifications and variations may be effected without departing from the scope of the novel concepts of the present invention.

We claim as our invention:

Apparatus for the manufacture of a joint socket from a length of hollow tubing comprising, an expandable die member for insertion within the tubing, said die member comprising a first substantially semi-cylindrical die member insertable endwise into said tubing snugly conforming to the inner surface thereof, a second die member carried by said first die member and resiliently maintained in a position separated from said first die member, guide means associated with said first and second die members limiting relative movement therebetween to a direction transverse to the longitudinal axis thereof, second generally rectangular guide means on said second die member for association with an elongated generally rectangular slot in said tube, tube-deforming means extending from said second guide means and comprising an enlarged base of non-rectangular configuration with a tapered surface extending from the rectangular guide means thereto whereby separation of said first and second die members within said tube will cause expansion of the walls of said slot into said non-rectangular configuration, and wedge means reciprocal along the axis of said tube between said first and second die members for expanding the walls of said slot by said tube-deforming means without deformation of the diametrically opposite tube wall to which the wedging forces are transmitted by said first die member.

References Cited in the file of this patent

UNITED STATES PATENTS

| Number | Name | Date |
|---|---|---|
| Re. 3,966 | Regan | May 10, 1870 |
| 284,704 | Zschech | Sept. 11, 1883 |
| 354,879 | Youngs | Dec. 21, 1886 |
| 550,750 | Forg | Dec. 3, 1895 |
| 621,675 | Hotz | Mar. 21, 1899 |
| 1,264,854 | Possons | Apr. 30, 1918 |
| 1,432,073 | Lowy | Oct. 17, 1922 |
| 1,521,866 | Carlson | Jan. 6, 1925 |
| 1,596,029 | Spire | Aug. 17, 1926 |
| 1,689,215 | Spire | Oct. 30, 1928 |
| 1,824,810 | Ford | Sept. 29, 1931 |
| 2,204,273 | Hale | June 11, 1940 |
| 2,213,574 | Weston | Sept. 3, 1940 |
| 2,254,924 | Williams | Sept. 2, 1941 |
| 2,310,083 | Holmes et al. | Feb. 2, 1943 |
| 2,367,121 | Hill | Jan. 9, 1945 |
| 2,557,722 | Brauchler | June 19, 1951 |

FOREIGN PATENTS

| Number | Country | Date |
|---|---|---|
| 795,211 | France | Mar. 9, 1936 |
| 698,848 | Germany | Oct. 17, 1940 |